United States Patent
Sun et al.

(10) Patent No.: US 11,367,867 B2
(45) Date of Patent: Jun. 21, 2022

(54) POSITIVE ELECTRODE FOR METAL-SULFUR BATTERY, MANUFACTURING METHOD THEREFOR, AND METAL-SULFUR BATTERY COMPRISING THE SAME

(71) Applicant: INDUSTRY-UNIVERSITY COOPERATION FOUNDATION HANYANG UNIVERSITY, Seoul (KR)

(72) Inventors: Yang Kook Sun, Seoul (KR); Jang Yeon Hwang, Cheongju-si (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 190 days.

(21) Appl. No.: 16/644,028

(22) PCT Filed: Sep. 4, 2018

(86) PCT No.: PCT/KR2018/010323
§ 371 (c)(1),
(2) Date: Mar. 3, 2020

(87) PCT Pub. No.: WO2019/045553
PCT Pub. Date: Mar. 7, 2019

(65) Prior Publication Data
US 2020/0350564 A1    Nov. 5, 2020

(30) Foreign Application Priority Data
Sep. 4, 2017 (KR) .................. 10-2017-0112542

(51) Int. Cl.
*H01M 4/00* (2006.01)
*H01M 4/36* (2006.01)
(Continued)

(52) U.S. Cl.
CPC ......... *H01M 4/364* (2013.01); *H01M 4/0433* (2013.01); *H01M 4/1393* (2013.01);
(Continued)

(58) Field of Classification Search
CPC ...... H01M 4/36; H01M 10/052; H01M 4/587; H01M 4/58; H01M 4/60; H01M 4/04
See application file for complete search history.

(56) References Cited

U.S. PATENT DOCUMENTS

2015/0061176 A1    3/2015 Bruckner et al.
2015/0236372 A1*   8/2015 Yushin ................ H01M 4/1397
                                                429/126
(Continued)

FOREIGN PATENT DOCUMENTS

DE    102012203019 A1    8/2013
EP         2894699 A1    7/2015
(Continued)

OTHER PUBLICATIONS

A. Grzechnik et al., "Reversible Antifluorite to Anticotunnite Phase Transition in Li2S at High Pressures", Journal of Solid State Chemistry, 2000, pp. 603-611, vol. 154.
(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

Provided are a positive electrode for a metal-sulfur battery, a method of manufacturing the same, and a metal-sulfur battery including the same. The positive electrode comprises a positive electrode active material layer including carbon material and sulfur-containing material. In the positive electrode active material layer, a region in which the sulfur-containing material is densified and a region in which the carbon material is densified are arranged separately. By (Continued)

providing a positive electrode capable of exhibiting a high utilization rate of sulfur, it is possible to provide a metal-sulfur battery having high capacity and stable life characteristics.

20 Claims, 15 Drawing Sheets

(51) Int. Cl.
*H01M 4/04* (2006.01)
*H01M 4/1393* (2010.01)
*H01M 4/38* (2006.01)
*H01M 4/58* (2010.01)
*H01M 4/587* (2010.01)
*H01M 4/60* (2006.01)
*H01M 10/052* (2010.01)
*H01M 4/02* (2006.01)

(52) U.S. Cl.
CPC ............ *H01M 4/38* (2013.01); *H01M 4/587* (2013.01); *H01M 4/5815* (2013.01); *H01M 4/602* (2013.01); *H01M 10/052* (2013.01); *H01M 2004/028* (2013.01)

(56) References Cited

U.S. PATENT DOCUMENTS

| | | | |
|---|---|---|---|
| 2018/0097224 A1* | 4/2018 | Yamaya | H01M 10/0525 |
| 2018/0138503 A1* | 5/2018 | Kim | H01M 4/587 |

FOREIGN PATENT DOCUMENTS

| | | |
|---|---|---|
| JP | 2012-227107 A | 11/2012 |
| JP | 2014-29777 A | 2/2014 |
| JP | 2015-503196 A | 1/2015 |
| KR | 10-2013-0107071 A | 10/2013 |
| KR | 10-2016-0031284 A | 3/2016 |
| KR | 10-2016-0051610 A | 5/2016 |
| KR | 10-2017-0032190 A | 3/2017 |
| KR | 10-2017-0035817 A | 3/2017 |
| WO | 2016/143701 A1 | 9/2016 |

OTHER PUBLICATIONS

International Search Report for PCT/KR2018/010323, dated Mar. 12, 2019.

* cited by examiner

Preparation Example A2 (Li$_2$S, mixing/ pelletizing)

Preparation Example A2 (Li$_2$S, mixing/ pelletizing)

Preparation Example A3 (Li$_2$S + S$_8$, mixing/ pelletizing)
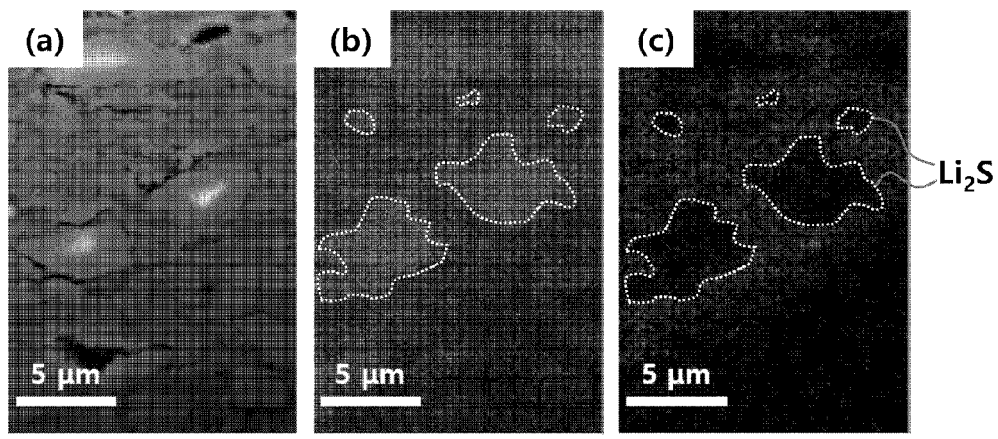
FIG.4A  FIG.4B  FIG.4C
Preparation Example A4 (S-PAN, mixing/pelletizing)
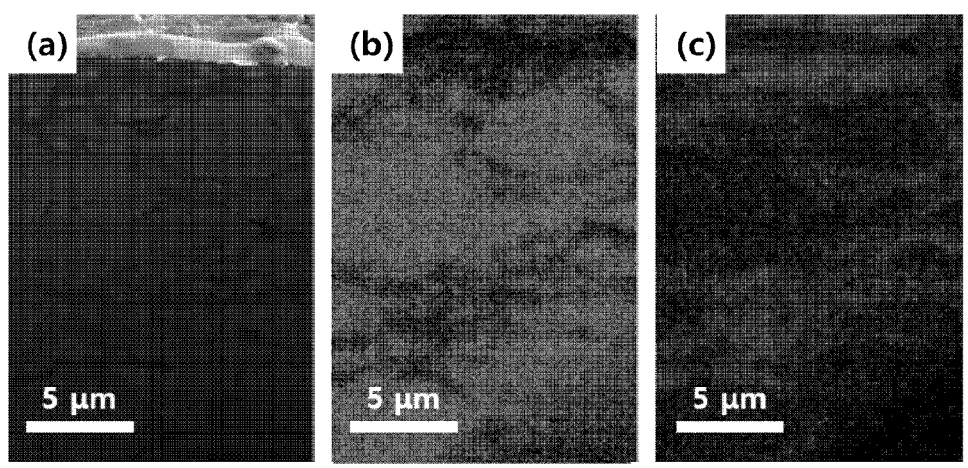
FIG.5A  FIG.5B  FIG.5C

Preparation Example B2 (Li$_2$S, mixing/ pelletizing)
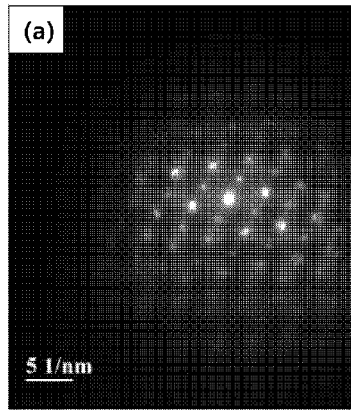
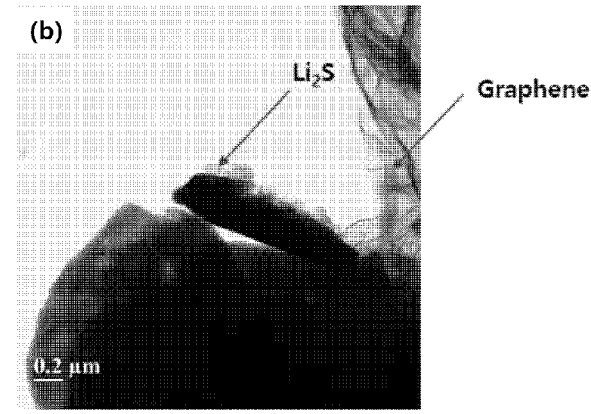
FIG.8A  FIG.8B
FIG.9
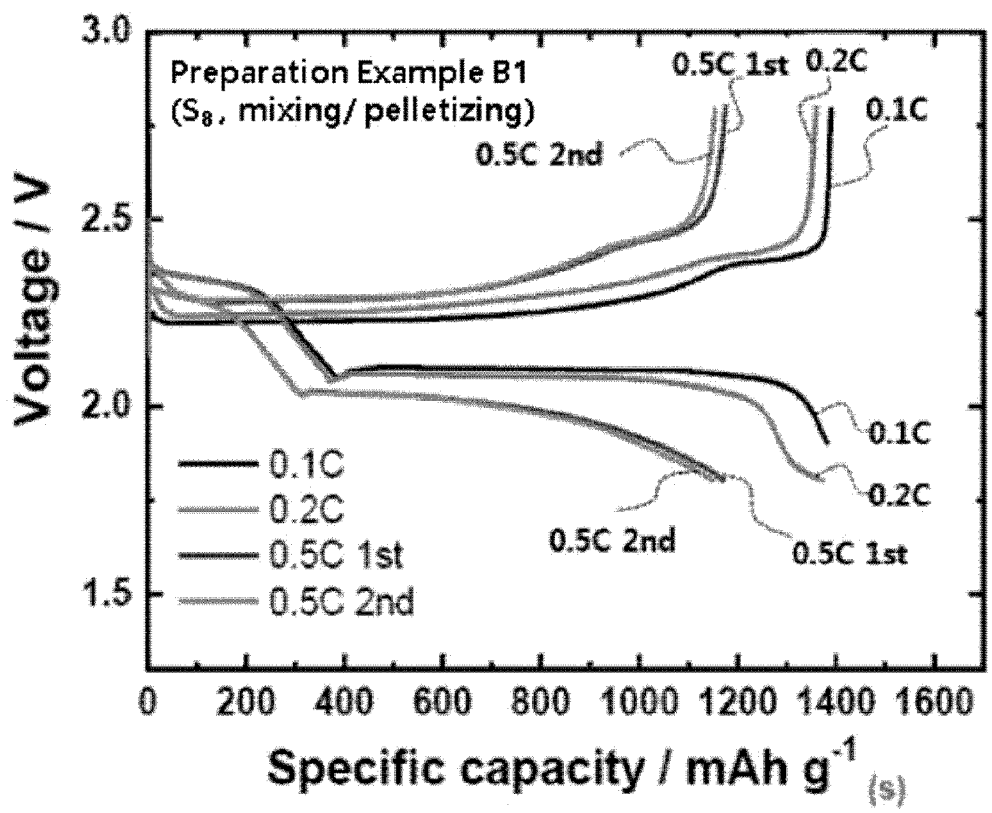

Preparation Example B2 (Li₂S, mixing/ pelletizing)

Preparation Example B3 (Li₂S + S₈, mixing/ pelletizing)

Preparation Example A4 (S-PAN, mixing/ pelletizing)

Comparation Example A3 (S-PAN, slurry casting)

Preparation Example B4 (S-PAN, mixing/ pelletizing)

POSITIVE ELECTRODE FOR METAL-SULFUR BATTERY, MANUFACTURING METHOD THEREFOR, AND METAL-SULFUR BATTERY COMPRISING THE SAME

CROSS REFERENCE TO RELATED APPLICATIONS

This application is a National Stage of International Application No. PCT/KR2018/010323 filed Sep. 4, 2018, claiming priority based on Korean Patent Application No. 10-2017-0112542 filed Sep. 4, 2017.

TECHNICAL FIELD

The present invention relates to a metal-sulfur battery, and more particularly to a positive electrode of the metal-sulfur battery.

BACKGROUND ART

Recently, with the rapid development of the electronic device field and the electric vehicle field, the demand for secondary batteries is increasing. In particular, with the trend toward miniaturization and light weight of portable electronic devices, there is a growing demand for secondary batteries having a high energy density.

Among the secondary batteries, lithium-sulfur batteries use a sulfur-based compound having a sulfur-sulfur bond as a positive electrode active material and a carbon-based material in which lithium ions can be intercalated and deintercalated as a negative electrode active material. In the positive electrode of such a lithium-sulfur battery, the oxidation number of sulfur decreases as the bond between sulfur and sulfur is broken during the reduction reaction (discharge), and the oxidation number of sulfur increases as the sulfur-sulfur bond is formed again during the oxidation reaction (charging). The redox reaction is used to store and generate electrical energy.

Such a lithium-sulfur battery has an advantage of expressing a high energy density per weight, and elemental sulfur used in the positive electrode active material has a high energy density per weight, low cost, and no harm to the human body. Therefore, as a next-generation secondary battery to replace the lithium secondary battery in the future market, lithium-sulfur batteries are receiving great attention, and it is expected to have a great influence, for example, in the mass Energy Storage System (ESS) and drone market.

However, a lithium-sulfur battery has a problem in that battery capacity is low due to low utilization of sulfur as a positive electrode active material (i.e., a ratio of sulfur participating in an electrochemical oxidation reaction) when the battery is working. In addition, the life of the lithium-sulfur battery is shortened because sulfur (lithium polysulfide) is eluted into the electrolyte when the battery is working, and in some cases, due to precipitation of lithium sulfide.

In addition, in the lithium-sulfur batteries, the sulfur as a positive electrode active material has low electrical conductivity, and thus, lithium polysulfide, which is a main electrochemical reaction medium of lithium-sulfur batteries, is difficult to form during the initial charging or discharging of lithium-sulfur batteries. Therefore, at low temperatures, there is a problem that the battery characteristics are significantly poor or the battery cannot work.

On the other hand, the conventional molding method for producing the electrode is complicated and inferior in reproducibility, in particular, the battery research using lithium sulfide has a great difficulty in electrode development due to susceptibility to moisture.

[Patent Document] Korea Patent Publication No. 10-2006-0023470

DISCLOSURE

Technical Problem

The problem to be solved by the present embodiment is to provide a method for producing a positive electrode for a metal-sulfur battery having a high capacity and stable life characteristics. In addition, the present embodiment provides a metal-sulfur battery that can work even at low temperatures, such as 0° C. to 10° C.

Technical Solution

One aspect of the present invention to solve the above technical problem provides a positive electrode for a lithium-sulfur battery. The positive electrode comprises a positive electrode active material layer including carbon material and sulfur-containing material. In the positive electrode active material layer, a region in which the sulfur-containing material is densified and a region in which the carbon material is densified are arranged separately.

The sulfur-containing material may be $S_8$, $Li_2S$, sulfurized polymer, or a mixture of two or more thereof. For example, the sulfur-containing material may be a mixture of $S_8$ and $Li_2S$. The weight of $S_8$ may be higher than that of $Li_2S$ in the positive electrode active material layer.

The carbon material may be graphene. The weight of the sulfur-containing material may be higher than that of the carbon material in the positive electrode active material layer. The positive electrode active material layer may include 60 to 90 wt % of the sulfur-containing material and the remaining wt % of the carbon material.

In the region where the sulfur-containing material is densified, nano-sized sulfur-containing material particles may be aggregated and surrounded by the carbon material. The sulfur-containing material may comprise lithium sulfide nanoparticles, and some of the lithium sulfide nanoparticles may be rod-shaped nanoparticles. The sulfur-containing material may comprise lithium sulfide, and the lithium sulfide has an orthorhombic crystal phase.

Another aspect of the present invention provides a method for producing a positive electrode for a metal-sulfur battery. The method comprises preparing a mixture of carbon material and sulfur-containing material, and putting the mixture into a mold to pressurize to form a positive electrode active material layer which is a freestanding film.

The sulfur-containing material may be $S_8$, $Li_2S$, sulfurized polymer, or a mixture of two or more thereof. The sulfur-containing material may be a mixture of $S_8$ and $Li_2S$. The weight of $S_8$ may be higher than that of $Li_2S$ in the positive electrode active material layer. The weight of the sulfur-containing material may be higher than that of the carbon material in the mixture. The pressurization may be performed at 750 to 1100 MPa.

The sulfur-containing material may contain $Li_2S$, and the $Li_2S$ may have a cubic phase in the mixture, and after being pressed, is changed into an orthorhombic phase in the positive electrode active material layer.

Another aspect of the present invention provides a metal-sulfur battery. The battery comprises the positive electrode, a negative electrode positioned to face the positive electrode, and an electrolyte located between the positive electrode and the negative electrode. The electrolyte may be a non-aqueous liquid electrolyte. The electrolyte may further include an ammonium salt.

Advantageous Effects

As described above, according to the present invention, by manufacturing a positive electrode capable of exhibiting a high utilization rate of sulfur, it is possible to provide a metal-sulfur battery having high capacity and stable life characteristics. In addition, by introducing an additive into the electrolyte, it is possible to promote the formation of lithium polysulfide to make a metal-sulfur battery capable to work at low temperature.

However, effects of the present invention are not limited to the above-mentioned effects, and other effects not mentioned will be clearly understood by those skilled in the art from the following description.

DESCRIPTION OF DRAWINGS

FIGS. 4A, 4B, and 4C are, respectively, a SEM image, an EDS image in a sulfur component is detected, and an EDS image in which a carbon component is detected for same cross section of the positive electrode active material layer according to Preparation Example A3.

FIGS. 5A, 5B, and 5C are, respectively, a SEM image, an EDS image in a sulfur component is detected, and an EDS image in which a carbon component is detected for same cross section of the positive electrode active material layer according to Preparation Example A4.

FIGS. 8A and 8B are, respectively, a SAED image and a TEM image of enlarged view of a portion of a cross section of the positive electrode active material layer taken after driving the lithium-sulfur battery according to Preparation Example B2 with the positive electrode active material layer according to Preparation Example A2.

FIG. 9 is a graph showing charge and discharge characteristics of a lithium-sulfur battery according to Preparation Example B1.

MODES OF THE INVENTION

Hereinafter, the present invention will be described in further detail with reference to examples.

It will be understood by one of ordinary skill in the art that the following embodiments are provided for illustrative and exemplary purposes only, and that numerous combinations and modification of the elements of the various embodiments of the present invention are possible.

Figure 1A:
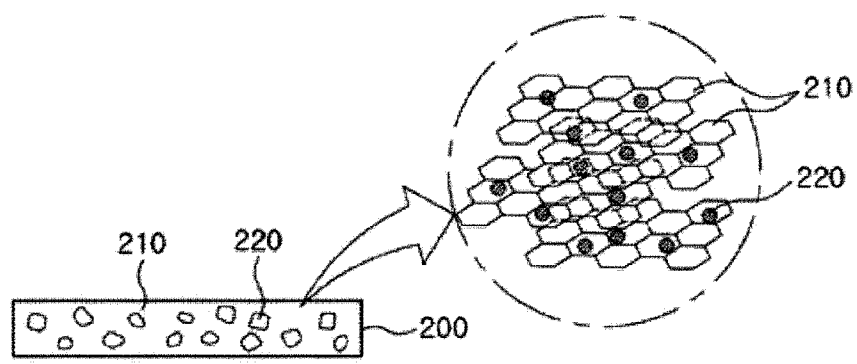
FIG. 1A is a schematic diagram showing a positive electrode for a metal-sulfur battery according to an embodiment of the present invention.
Figure 1B:
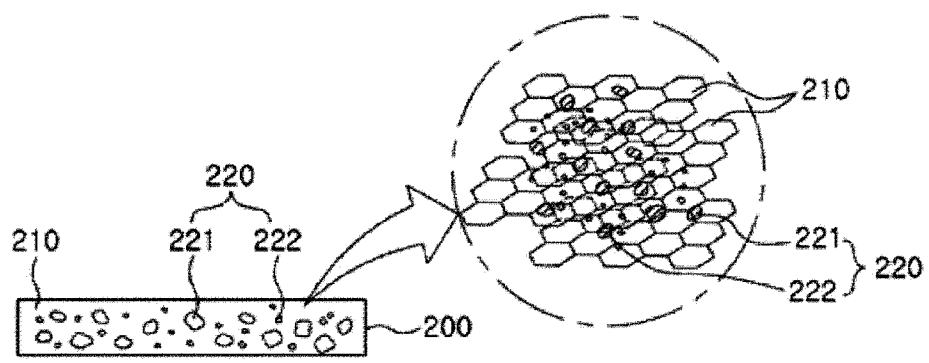
FIG. 1B is a schematic diagram showing a positive electrode for a metal-sulfur battery according to another embodiment of the present invention.

FIG. 1A is a schematic diagram showing a positive electrode for a metal-sulfur battery according to an embodiment of the present invention, and FIG. 1B is a schematic diagram showing a positive electrode for a metal-sulfur battery according to another embodiment of the present invention.

Referring to FIGS. 1A and 1B, a positive electrode active material layer 200 including a carbon material 210 and a sulfur-containing material 220 may be provided.

In the positive electrode active material layer 200, the carbon material 210 and the sulfur-containing material 220 may form a composite. Specifically, the composite may have a structure in which the sulfur-containing material 220 is dispersed on the surface of the carbon material 210 or between the carbon materials 210. In detail, regions in which the sulfur-containing materials 220 are densely located and regions in which the carbon materials 210 are densely located may be separately disposed in the positive electrode active material layer 200. In this case, the region in which the sulfur-containing materials 220 are densely located may mean a region where the density or the concentration of the sulfur-containing material 220 is higher than that of the carbon material 210, and the region in which the carbon materials 210 are densely located may mean a region where the density or the concentration of the carbon material 210 is higher than that of the sulfur-containing material 220.

The positive electrode active material layer 200 is a layer not including a binder such as a polymer binder, and may be a layer including only the carbon material 210 and the sulfur-containing material 220. As an example, the positive electrode active material layer 200 may contain about 60 to 90 wt % of the sulfur-containing material 220 and the remaining wt % of carbon material 210. In this case, the sulfur-containing material 220 may be contained at about 60 to 80 wt %, about 60 to 75 wt %, about 65 to 75 wt %, for example about 70 wt %. In addition, the positive electrode active material layer 200 may have a loading amount of sulfur of 2 to 30 mg/cm$^2$, specifically 5 to 25 mg/cm$^2$, and more specifically 10 to 20 mg/cm$^2$. This may be a significant increase compared to the loading amount of sulfur in a positive electrode active material layer which is formed by the conventional slurry casting method.

The positive electrode active material layer 200 may have a thickness of about 90 to 100 μm.

The carbon material 210 may be a conductive carbon material, for example, graphene or carbon nanotubes (CNT). For example, the carbon material 210 may be graphene. The graphene may be graphene flakes obtained from reduced graphene oxide or graphite.

The sulfur-containing material 220 may be elemental sulfur, a metal sulfide, a sulfurized polymer, or a mixture of two or more thereof. The elemental sulfur may be an octasulfur ($S_8$) molecule, specifically a cyclo-octasulfur (cyclo-$S_8$) molecule. The metal sulfide may be lithium sulfide such as $Li_2S$. The sulfurized polymer may be, for example, sulfur-polyacrylonitrile (S-PAN), sulfur-polyaniline, sulfur-(1,3-diisopropenylbenzene polyvinylidene dichloride), or sulfur-(polyvinylidene dichloride-co-acrylonitrile).

In specific embodiments, the sulfur-containing material 220 may be elemental sulfur, lithium sulfide such as $Li_2S$, or a sulfurized polymer as shown in FIG. 1A, or a mixture of elemental sulfur 222 and lithium sulfide 221 as shown in FIG. 1B. Here, the elemental sulfur may be contained in a greater weight than lithium sulfide. When the sulfur-containing material 220 is a mixture of elemental sulfur and lithium sulfide, the discharge efficiency is improved by increasing the amount of sulfur that can participate in the reaction during the discharge after charging in a metal-sulfur battery, thereby greatly lowering the initial irreversible capacity.

The sulfur-containing material 220 may have a form in which nano-sized sulfur-containing material particles are aggregated and may be wrapped by the carbon material 210. Specifically, aggregates of lithium sulfide ($Li_2S$) among the sulfur-containing material 220 have an average diameter of a micron size, specifically, several micrometers to several tens of micrometers, for example, 1 μm to 99 μm, 1 μm to 50 μm, more specifically 1 μm to 20 μm. The aggregates of elemental sulfur ($S_8$) among the sulfur-containing material 220 may have an average diameter of 1 μm or less, for example, 0.001 μm to 0.9 μm, specifically, 0.01 μm to 0.9 μm. Some of the lithium sulfide nanoparticles included in the lithium sulfide aggregate may have a rod shape. In addition, the lithium sulfide nanoparticles may have an orthorhombic crystal phase, and further, the space group thereof may be Pnma, and may have a Cs2S structure. Considering that lithium sulfide generally exhibits a cubic phase, the phase change of lithium sulfide may be due to the pressure applied in the process of forming the positive electrode active material layer.

The positive electrode active material layer 200 may be a free standing pellet formed by mechanically mixing the carbon material 210 and the sulfur-containing material 220 to form a mixture, and then placing the mixture into a mold and pressing the mixture.

Conventionally, a positive electrode active material layer containing sulfur is formed using a method of impregnating a carbon material with a sulfur-containing material, specifically, a method of melt-infiltration including melting a sulfur-containing material and impregnating a carbon material with the melted sulfur-containing material; or a method of casting a slurry containing a sulfur-containing material, a carbon material, and a binder on a current collector. In the case of the positive electrode active material layer formed by melt-infiltration, the sulfur-containing material is filled in the carbon material and bonded to the carbon material with almost homogeneous and sparse distribution in the positive electrode active material layer; thus, metal ions, in particular, lithium ions may be difficult to transfer to the sulfur-containing material, thereby lowering charge and discharge capacity. On the other hand, in the present embodiments, the sulfur-containing material 220 is densely distributed between the surfaces of the carbon material 210 or between the carbon materials 210, thereby increasing the accessibility of lithium ions to the sulfur-containing material 220 to increase utilization rate of sulfur. Accordingly, it is possible to exhibit a more excellent effect in terms of the capacitance of the lithium-sulfur battery including the positive electrode active material layer 200. Meanwhile, in the case of the positive electrode active material layer formed by using slurry casting, the binder is essentially contained, so that a specific capacity, which is a capacity per unit weight, may be significantly lower than that of the present embodiment.

In the mixture, the carbon material 210 and the sulfur-containing material 220 may have a weight ratio, for example, 0.5:9.5 to 9.5:0.5. In the mixture, the sulfur-containing material 220 may be contained at a higher weight than the carbon material 210, specifically, the carbon material 210 and the sulfur-containing material 220 may be mixed at a weight ratio of 1:9 to 4:6, specifically 2:8 to 4:6, more specifically 2.5:7.5 to 4:6, even more specifically 2.5:7.5 to 3.5:6.5, for example, a weight ratio of 3:7 (carbon material:sulfur-containing material). For example, when the sulfur-containing material is a mixture of elemental sulfur ($S_8$) and lithium sulfide, the elemental sulfur ($S_8$) and lithium sulfide may be included in a weight ratio of 60:40 to 95:5, specifically, 60:40 to 80:20, for example, 70:30.

The weight ratio may be in a range in which ion transport paths and energy densities can be secured with an appropriate content of sulfur-containing material 220 while forming a conductive network by the carbon material 210 to secure electrical conductivity of the electrode. In this embodiment, the utilization rate of sulfur can be further improved by disposing the sulfur-containing material 200 non-uniformly in the positive electrode active material layer 200 without significantly increasing the content of the sulfur-containing material 220 in the positive electrode active material layer 200.

The mixing, in particular, mechanical mixing by a mixer-mill, may be performed at 80 rpm to 120 rpm, specifically at 90 rpm to 110 rpm, more specifically at 95 rpm to 105 rpm, for 30 minutes to 90 minutes, specifically 45 minutes to 75 minutes.

The positive electrode active material layer 200 may be manufactured by pressing the mixture. Specifically, the mixture can be placed in a mold and pressurized using, for example, a hydraulic press. For example, the pressure applied to the positive electrode active material layer 200 may be 250 to 1200 MPa, specifically 750 to 1100 MPa, and more specifically 900 to 1050 MPa.

Accordingly, the positive electrode active material layer 200 may not be applied on a substrate or a current collector, but may be used as an electrode by itself. Specifically, the positive electrode active material layer 200 may be a free-standing film, and more specifically, the freestanding film may be laminated in multiple layers for use as a positive electrode. Even in this case, the positive electrode active material layer 200 may maintain access to the sulfur-containing material 220.

In addition, the method of manufacturing the positive electrode active material layer 200 through the pressurization without adding an inert material such as a binder that do not contribute to capacity can increase specific capacity and the utilization rate of sulfur.

Furthermore, the positive electrode manufacturing method of the present embodiment which performs only a simple mixing and pressurization process of the carbon material and the sulfur-containing material can exhibit a simplification of the process while increasing the utilization rate of sulfur.

A metal-sulfur battery (not shown) including the positive electrode active material layer 200 may be provided. Specifically, the metal-sulfur battery may be an alkali metal-sulfur battery, more specifically, a lithium-sulfur battery. The metal-sulfur battery may include a positive electrode including the positive electrode active material layer 200, a negative electrode positioned to face the positive electrode, a separator positioned between the positive electrode and the negative electrode, and an electrolyte impregnated within the positive electrode, the negative electrode and the separator.

The negative electrode may include a lithium metal or a lithium alloy as an active material. In this case, the lithium alloy may be an alloy of lithium with at least one metal selected from the group consisting of Na, K, Rb, Cs, Fr, Be, Mg, Ca, Sr, Ba, Ra, Al, and Sn.

The separator may enable transport of lithium ions between the positive electrode and the negative electrode while separating or insulating the positive electrode and the negative electrode from each other. The separator may be made of a porous, nonconductive or insulating material.

The electrolyte may be a liquid electrolyte. Specifically, the liquid electrolyte may be a non-aqueous electrolyte, that is, lithium salt dissolved in an organic solvent. The organic solvent may be an aprotic solvent, specifically, may be any one selected from the group consisting of N-methyl-2-pyrrolidinone, propylene carbonate, ethylene carbonate, butylene carbonate, dimethyl carbonate, diethyl carbonate, ethylmethyl carbonate, gamma-butyl lactone and 1, 2-dimethoxy ethane. The lithium salt may be used without particular limitation as long as it is used in a conventional lithium battery. For example, the lithium salt may be at least one compound selected from the group consisting of LiSCN, LiBr, LiI, $LiNO_3$, $LiPF_6$, $LiBF_4$, $LiSbF_6$, $LiAsF_6$, $LiCH_3SO_3$, $LiCF_3SO_3$, $LiClO_4$, $Li(Ph)_4$, $LiC(CF_3SO_2)_3$, $LiN(CF_3SO_2)_2$, $LiN(C_2F_5SO_2)_2$, and $LiN(CF_3CF_2SO_2)_2$.

The electrolyte may further include an additive. The additive may lower the activation energy for the formation of lithium polysulfide from a sulfur-containing material, for example lithium sulfide, which is a positive electrode active material, in the initial charge, thereby reducing the operation temperature of the cell even at low temperatures, specifically from −20° C. to 10° C. Thus, by solving the problem of the lithium-sulfur battery, which can work only at room temperature (about 25° C. to 30° C.) in the past, it is possible to further improve the performance of the battery.

The additive may be an ammonium compound, specifically an ammonium ion-containing compound capable of providing ammonium ions ($NH^{4+}$), more specifically an ammonium salt. For example, the additive may be ammonium nitrate. More specifically, the ammonium ions in the additive may promote the formation of lithium polysulfide. For example, the additive may be contained in 0.01M to 2.0M, specifically, 0.1M to 1.5M.

Hereinafter, exemplary examples are provided to help in understanding the present invention. However, the following examples are merely provided to help in understanding of the present invention, and the present invention is not limited to the following examples.

Preparation Examples of Positive Electrode Active Material Layer

Preparation Example A1: Preparation of $S_8$-Containing Positive Electrode Active Material Layer A mixture of 0.03 g of graphene and 0.07 g of elemental sulfur powder ($S_8$ powder) was mixed with a mixer-mill at 8 Hz for 30 minutes. A portion of the mixture was placed in a mold and pressurized to 40 MPa by a hydraulic press to prepare a positive electrode active material layer. In this case, the pressure received by the positive electrode active material layer was 1 GPa in consideration of the area of the positive electrode active material layer. The weight ratio between the materials in the positive electrode active material might be maintained to be the same as the mixture.

Preparation Example A2: Preparation of $Li_2S$-Containing Positive Electrode Active Material Layer A positive electrode active material layer was prepared in the same manner as in Preparation Example A1, except that 0.07 g of lithium sulfide ($Li_2S$) was used instead of 0.07 g of the elemental sulfur powder.

Preparation Examples A2-1 to A2-3: Preparation of Li$_2$S-Containing Positive Electrode Active Material Layer Positive electrode active material layers were prepared in the same manner as in Preparation Example A2, except that the pressure received by the positive electrode active material layer when pressurized by the hydraulic press was 750 MPa (Preparation Example A2-1), 500 MPa (Preparation Example A2-2), and 250 MPa (Preparation Example A2-3), instead of 1 GPa.

Preparation Examples A2-4 to A2-7: Preparation of Li$_2$S-Containing Positive Electrode Active Material Layer Positive electrode active material layers were prepared in the same manner as in Preparation Example A2, except that 0.04 g of graphene and 0.06 g of lithium sulfide (Preparation Example A2-4), 0.02 g of graphene and 0.08 g of lithium sulfide (Preparation Example A2-5), 0.01 g of graphene and 0.09 g of lithium sulfide (Preparation Example A2-6), or 0.005 g of graphene and 0.095 g of lithium sulfide (Preparation Example A2-7) were used instead of 0.03 g of graphene and 0.07 g of lithium sulfide.

Preparation Example A3: Preparation of S$_8$ & Li$_2$S-Containing Positive Electrode Active Material Layer A positive electrode active material layer was prepared in the same manner as in Preparation Example A1, except that a mixture of 0.03 g of graphene, 0.05 g of elemental sulfur powder, and 0.02 g of lithium sulfide (Li$_2$S) was used instead of a mixture of 0.03 g of graphene and 0.07 g of the elemental sulfur powder.

Preparation Example A4: Preparation of S-PAN Containing Positive Electrode Active Material Layer A mixture of 0.02 g of graphene and 0.08 g of S-PAN (sulfur-polyacrylonitrile) was mixed with a mixer-mill at 8 Hz for 30 minutes. A portion of the mixture was placed in a mold and pressurized to 40 MPa by a hydraulic press to prepare a positive electrode active material layer. In this case, the pressure received by the positive electrode active material layer was 1 GPa in consideration of the area of the positive electrode active material layer. The weight ratio between the materials in the positive electrode active material might be maintained to be the same as the mixture.

Comparative Example A1: Preparation of S$_8$-Containing Positive Electrode Active Material Layer A positive electrode active material layer was prepared in the same manner as in Preparation Example A1, except that the milled mixture was heat-treated at 600° C. for 13 hours before being pressurized with a hydraulic press. By the heat treatment, the elemental sulfur S$_8$ was melted and uniformly supported in the graphene, that is, between the graphene unit layers.

Comparative Example A2: Preparation of Li$_2$S-Containing Positive Electrode Active Material Layer (Slurry Coating)

A slurry for a positive electrode active material in which 0.001 g of graphene, 0.008 g of lithium sulfide, and 0.001 g of binder (Polyvinylidene fluoride, PVdF) were mixed in a solvent (N-Methyl-2-pyrrolidone) was applied on aluminum foil (current collector) and then dried to prepare a positive electrode active material layer.

Comparative Example A3: Preparation of S-PAN Containing Positive Electrode Active Material Layer (Slurry Coating)

A slurry for a positive electrode active material in which 0.001 g of graphene, 0.008 g of S-PAN, and 0.001 g of binder (Polyvinylidene fluoride, PVdF) were mixed in a solvent (N-Methyl-2-pyrrolidone) was applied on aluminum foil (current collector) and then dried to prepare a positive electrode active material layer.

Preparation Examples of Lithium-Sulfur Battery

Preparation Example B1 to B4, and B2-1 to B2-7

Coin cells containing the positive electrode active material layer prepared by any one of the above-described Preparation Examples A1 to A4, and A2-1 to A2-7, a positive electrode current collector which is an aluminum foil, a negative electrode of lithium foil, and an electrolyte including 0.5 M lithium bis(trifluoromethanesulfonyl) imide (LiTFSI) and 0.8 M LiNO$_3$ in dimethoxyethane and 1,2-dioxolane (DOL) in a volume ratio of 1:1 were prepared.

Preparation Example B5: Preparation of Lithium-Sulfur Battery Containing Ammonium Nitrate in Electrolyte Coin cell containing the positive electrode active material layer prepared by the Preparation Example A2, a positive electrode current collector which is an aluminum foil, a negative electrode of lithium foil, and an electrolyte including 0.25M ammonium nitrate, 0.5 M lithium bis(trifluoromethanesulfonyl) imide (LiTFSI) and 0.8 M LiNO$_3$ in dimethoxyethane and 1,2-dioxolane (DOL) in a volume ratio of 1:1 was prepared.

Comparative Example B1 to B3

Coin cells containing the positive electrode active material layer prepared by any one of the above-described Comparative Examples A1 to A3, a positive electrode current collector which is an aluminum foil, a negative electrode of lithium foil, and an electrolyte including 0.5 M lithium bis(trifluoromethanesulfonyl) imide (LiTFSI) and 0.8 M LiNO$_3$ in dimethoxyethane and 1,2-dioxolane (DOL) in a volume ratio of 1:1 were prepared. The positive electrode active material layer prepared by the Comparative Example A1 was positioned on the positive electrode current collector which is an aluminum foil.

Specific conditions of Preparation Examples and Comparative Examples are summarized in Table 1 below.

TABLE 1

| | Positive electrode Active Material Layer | | | | | | |
|---|---|---|---|---|---|---|---|
| | Materials | | | Preparation Method | | | |
| | | | | thermal | pressure on | Battery | |
| | carbon (weight ratio) | sulfur-containing material (weight ratio) | binder (weight ratio) | treatment after mixing | positive electrode active material layer | | additive in electrolyte |
| Preparation Example A1 | graphene (3) | $S_8$ (7) | — | — | 1 GPa | Preparation Example B1 | — |
| Preparation Example A2 | graphene (3) | $Li_2S$ (7) | — | — | 1 GPa | Preparation Example B2 | — |
| | | | | | | Preparation Example B5 | $NH_4NO_3$ 0.25 M |
| Preparation Example A2-1 | graphene (3) | $Li_2S$ (7) | — | — | 750 MPa | Preparation Example B2-1 | — |
| Preparation Example A2-2 | graphene (3) | $Li_2S$ (7) | — | — | 500 MPa | Preparation Example B2-2 | — |
| Preparation Example A2-3 | graphene (3) | $Li_2S$ (7) | — | — | 250 MPa | Preparation Example B2-3 | — |
| Preparation Example A2-4 | graphene (4) | $Li_2S$ (6) | — | — | 1 GPa | Preparation Example B2-4 | — |
| Preparation Example A2-5 | graphene (2) | $Li_2S$ (8) | — | — | 1 GPa | Preparation Example B2-5 | — |
| Preparation Example A2-6 | graphene (1) | $Li_2S$ (9) | — | — | 1 GPa | Preparation Example B2-6 | — |
| Preparation Example A2-7 | graphene (0.5) | $Li_2S$ (9.5) | — | — | 1 GPa | Preparation Example B2-7 | — |
| Preparation Example A3 | graphene (3) | $S_8$ & $Li_2S$ (7) | — | — | 1 GPa | Preparation Example B3 | — |
| Preparation Example A4 | graphene (2) | S-PAN (8) | — | — | 1 GPa | Preparation Example B4 | — |
| Comparative Example A1 | graphene (3) | $S_8$ (7) | — | 600° C., 13 h | 1 GPa | Comparative Example B1 | — |
| Comparative Example A2 | graphene (1) | $Li_2S$ (8) | PVdF (1) | slurry casting | | Comparative Example B2 | — |
| Comparative Example A3 | graphene (1) | S-PAN (8) | PVdF (1) | slurry casting | | Comparative Example B3 | — |

Figure 2A:
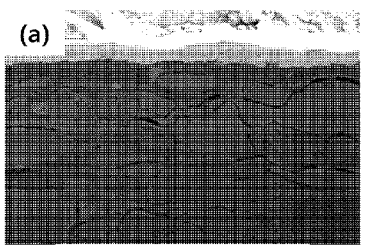
FIGS. 2A, 2B, and 2C are, respectively, a scanning electron microscopy (SEM) image, an energy dispersive x-ray spectroscopy (EDS) image in which a sulfur component is detected, and an EDS image in which a carbon component is detected for same cross section of the positive electrode active material layer according to Preparation Example A2.
Figure 2B:
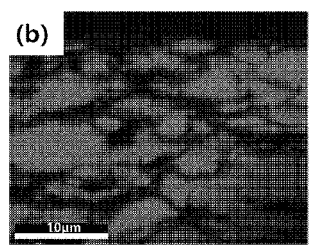
Figure 2C:
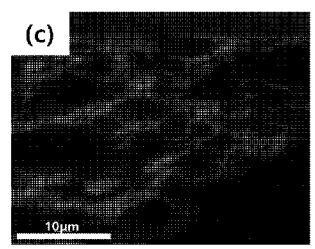
Figure 3A:
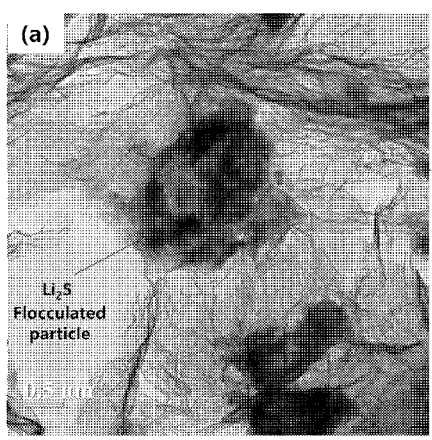
FIGS. 3A and 3B show transmission electron microscopy (TEM) images showing an enlarged portion of a cross section of the positive electrode active material layer according to Preparation Example A2.
Figure 3B:
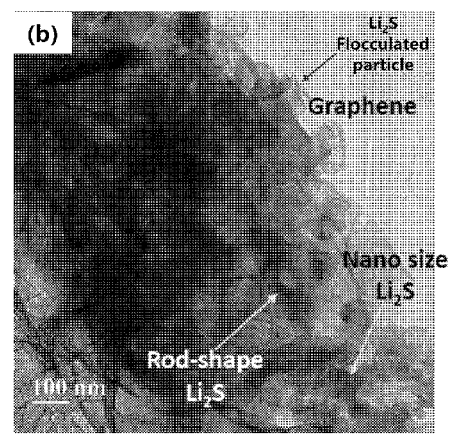

FIGS. 2A, 2B, and 2C are, respectively, a scanning electron microscopy (SEM) image, an energy dispersive x-ray spectroscopy (EDS) image in which a sulfur component is detected, and an EDS image in which a carbon component is detected for same cross section of the positive electrode active material layer according to Preparation Example A2. FIGS. 3A and 3B show transmission electron microscopy (TEM) images showing an enlarged portion of a cross section of the positive electrode active material layer according to Preparation Example A2.

Referring to FIGS. 2A, 2B, and 2C, in the case of the positive electrode active material layer in which the graphene and lithium sulfide are mechanically mixed and then pelletized by pressing according to Preparation Example A2, it can be seen that the region in which the sulfur component is concentrated (FIG. 2B) and the region in which the carbon component is concentrated (FIG. 2B) are separated or distinguished from each other. From the above, in the case of the positive electrode active material layer in which the graphene and the lithium sulfide are mechanically mixed and then pelletized by pressing, it can be assumed that the lithium sulfide-dense region and the graphene-dense region are separated or distinguished from each other.

Referring to FIGS. 3A and 3B, it can be seen that a region in which lithium sulfide is concentrated is a region in which lithium sulfide particle aggregates are located. Each lithium sulfide particle aggregate has flocculated nano-sized lithium sulfide primary particles. It can be seen that the lithium sulfide particle aggregate has a micro meter size whose maximum width is approximately 2 um. In addition, it can be seen that lithium sulfide particles in the form of rods are present among the nano-sized lithium sulfide primary particles. In addition, it can be estimated that the lithium sulfide particle aggregate is wrapped by the graphene sheet.

Figures 6A, 6B, 6C:
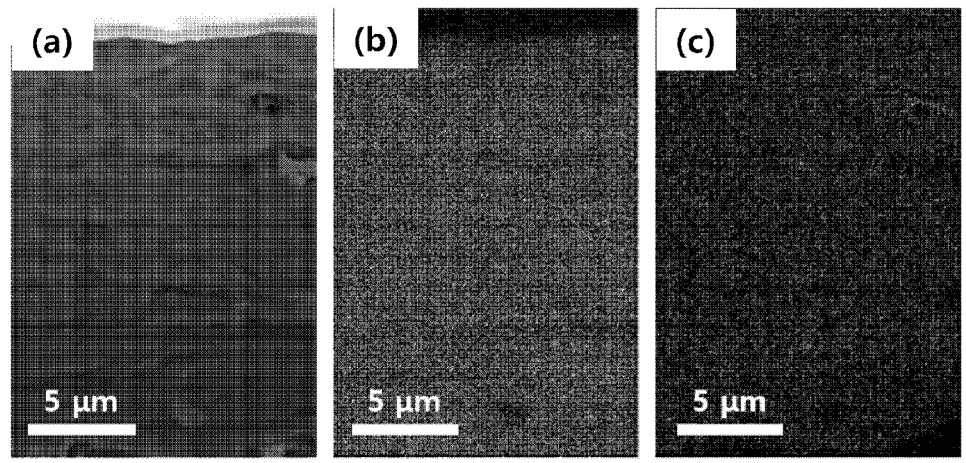
FIGS. 6A, 6B, and 6C are, respectively, a SEM image, an EDS image in a sulfur component is detected, and an EDS image in which a carbon component is detected for same cross section of the positive electrode active material layer according to Preparation Example A1.

FIGS. 4A, 4B, and 4C are, respectively, a SEM image, an EDS image in a sulfur component is detected, and an EDS image in which a carbon component is detected for same cross section of the positive electrode active material layer according to Preparation Example A3. FIGS. 5A, 5B, and 5C are, respectively, a SEM image, an EDS image in a sulfur component is detected, and an EDS image in which a carbon component is detected for same cross section of the positive electrode active material layer according to Preparation Example A4. FIGS. 6A, 6B, and 6C are, respectively, a SEM image, an EDS image in a sulfur component is detected, and an EDS image in which a carbon component is detected for same cross section of the positive electrode active material layer according to Preparation Example A1.

Referring to FIGS. 4A, 4B, 4C, 5A, 5B, and 5C, the pellet-type positive electrode active material layer formed by pressing a mixture of graphene, lithium sulfide, and sulfur according to Preparation Example A3 includes a region where the sulfur component is dense and a region where the carbon component is dense. Likewise, the pellet-type positive electrode active material layer formed by pressing a mixture of graphene and S-PAN according to Preparation Example A4 includes a region where the sulfur component is dense and a region where the carbon component is dense. In both cases, the region where the sulfur component is dense is distinguished from the region where the carbon component is dense.

Referring to FIGS. 4A, 4B, 4C, 6A, 6B, and 6C, since sulfur ($S_8$) is somewhat softer than lithium sulfide, it can be seen that it spreads throughout the positive electrode active material layer and exhibits a uniform distribution when pressed for pelletization. However, even in this case, it is determined that regions in which the sulfur ($S_8$) nanoparticles are concentrated are distributed in the positive electrode active material layer.

Figures 7A, 7B:
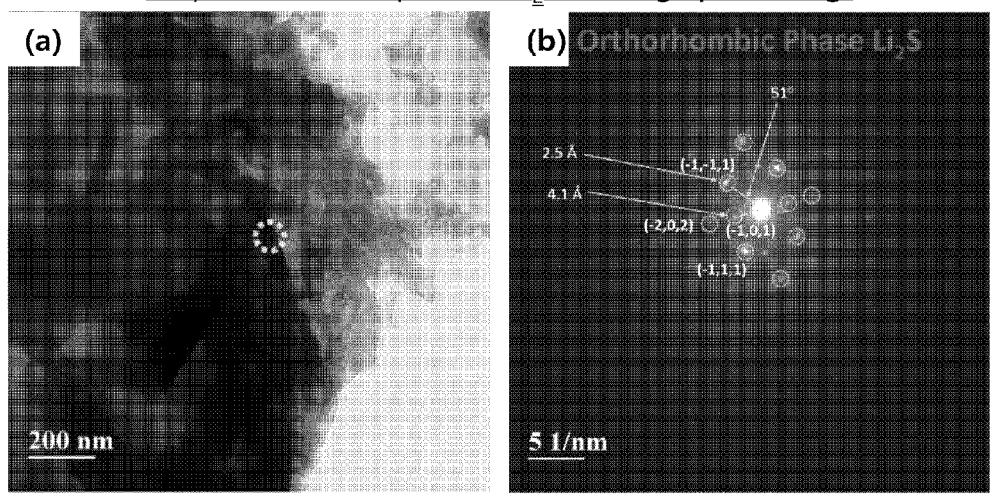
FIGS. 7A and 7B are a TEM image showing an enlarged portion of a cross section of the positive electrode active material layer according to Preparation Example A2 and a selected area electron diffraction (SAED) image for the region indicated in the TEM image, respectively.

FIGS. 7A and 7B are a TEM image showing an enlarged portion of a cross section of the positive electrode active material layer according to Preparation Example A2 and a selected area electron diffraction (SAED) image for the region indicated in the TEM image, respectively.

Referring to FIGS. 7A and 7B, in the case of the positive electrode active material layer which is pelletized by pressing the mixture of graphene and lithium sulfide, lithium sulfide forms nanoparticles by pressurization (1 GPa). It can be seen that the lithium sulfide nanoparticles exhibit an orthorhombic phase, which is a crystal structure different from the cubic phase originally possessed by lithium sulfide.

FIGS. 8A and 8B are, respectively, a SAED image and a TEM image of enlarged view of a portion of a cross section of the positive electrode active material layer taken after driving the lithium-sulfur battery according to Preparation Example B2 with the positive electrode active material layer according to Preparation Example A2.

Referring to FIGS. 8A and 8B, it can be seen that the orthorhombic phase of lithium sulfide is maintained even during the charging/discharging process.

Figure 10:
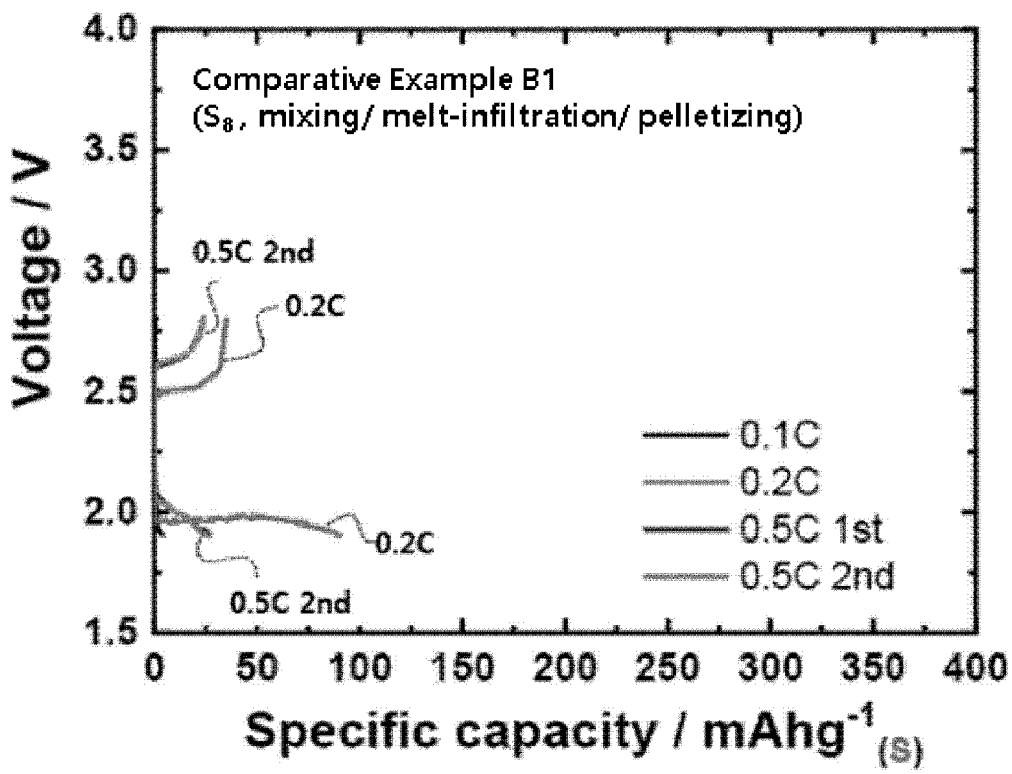
FIG. 10 is a graph showing charge and discharge characteristics of a lithium-sulfur battery according to Comparative Example B1.

FIG. 9 is a graph showing charge and discharge characteristics of a lithium-sulfur battery according to Preparation Example B1, and FIG. 10 is a graph showing charge and discharge characteristics of a lithium-sulfur battery according to Comparative Example B1. Here, constant current discharge and charging were performed over one cycle at 1.9-2.8 V at 0.1 C, and then constant current discharge and charging at one cycle at 1.9-2.8 V at 0.2 C, and then constant current discharge and charging at two cycles at 1.8-2.8 V at a rate of 0.5 C.

Referring to FIG. 9, a lithium-sulfur battery according to Preparation Example B1 having a positive electrode active material layer that was pelletized by pressing the mixture of graphene and sulfur ($S_8$) according to Preparation Example A1 shows the discharge capacity of 1200 mAh/g or more.

On the other hand, referring to FIG. 10, a lithium-sulfur battery according to Comparative Example B1 having a positive electrode active material layer that was pelletized by pressing the melt-infiltrated mixture of graphene and sulfur ($S_8$) according to Comparative Example A1 exhibits a discharge capacity of 100 mAh/g or less.

As such, the positive electrode active material layer formed by mechanically mixing the graphene and the sulfur ($S_8$) shows significantly improved the utilization rate of sulfur ($S_8$) compared to the positive electrode active material layer formed by melting sulfur ($S_8$) and impregnating the graphene with the melted sulfur.

Figure 11:
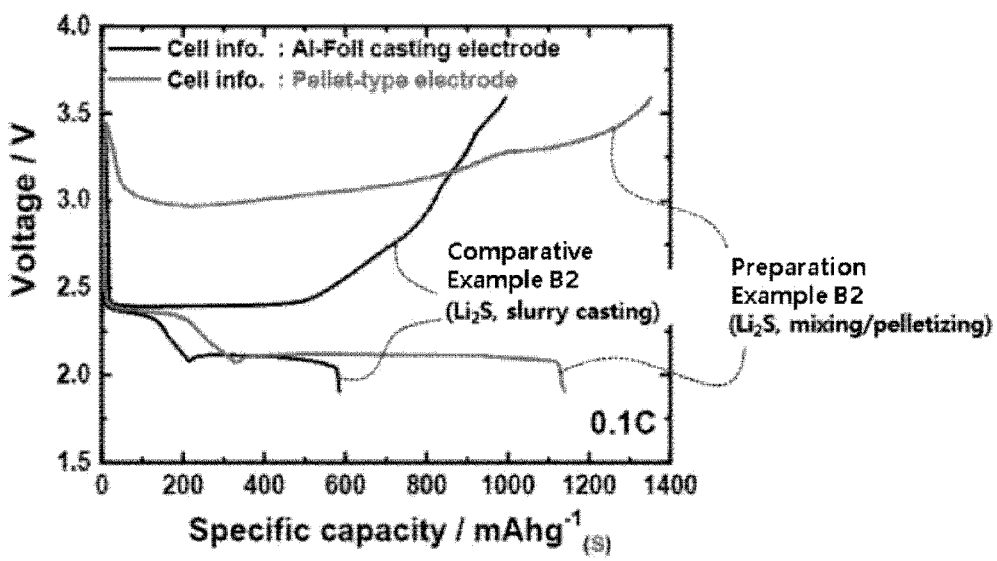
FIG. 11 is a graph showing charge and discharge characteristics of a lithium-sulfur battery according to Preparation Example B2 and Comparative Example B2.
Figure 12:
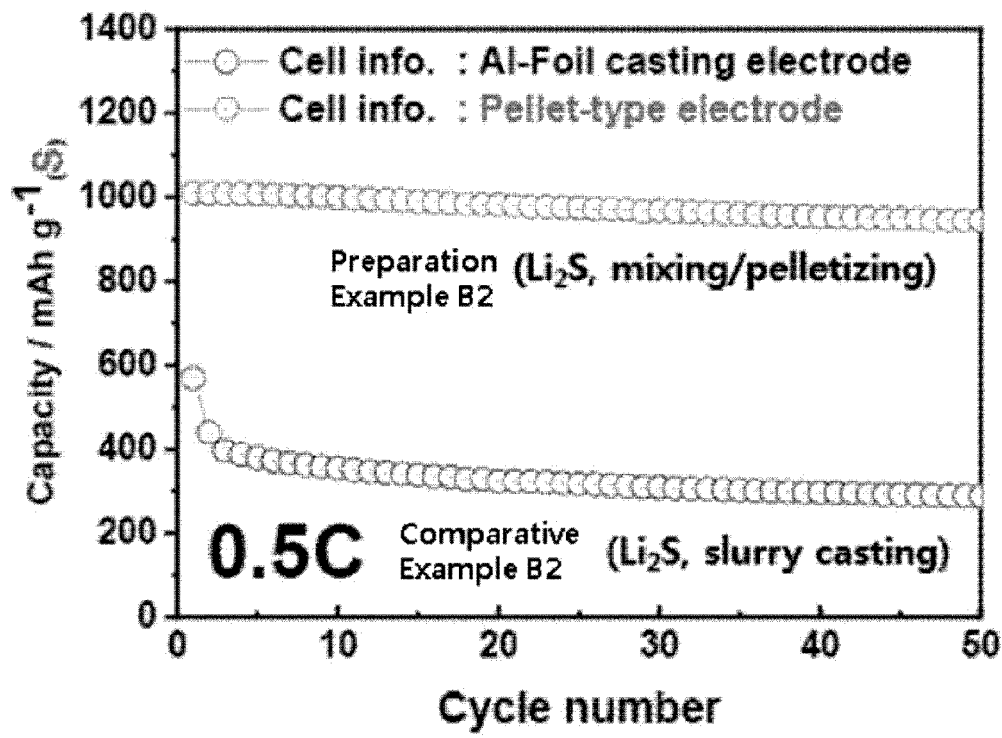
FIG. 12 is a graph showing cycle characteristics of a lithium-sulfur battery according to Preparation Example B2 and Comparative Example B2.

FIG. 11 is a graph showing charge and discharge characteristics of a lithium-sulfur battery according to Preparation Example B2 and Comparative Example B2, and FIG. 12 is a graph showing cycle characteristics of a lithium-sulfur battery according to Preparation Example B2 and Comparative Example B2. The charge and discharge characteristics shown in FIG. 11 were obtained when constant current charge and discharge were performed at 3.6-1.9 V at a rate of 0.1 C, and the cycle characteristics shown in FIG. 12 were obtained when constant current charge and discharge at 2.8-1.8 V at a rate of 0.5 C over 50 cycles. In addition, the specific capacity shown in the X-axis of FIG. 11 and the Y-axis of FIG. 12 is the capacity with respect to the weight of sulfur contained in the positive electrode active material.

Referring to FIGS. 11 and 12, a lithium-sulfur battery according to Preparation Example B2 including a positive electrode active material layer which was pelletized by pressing the mixture of graphene and lithium sulfide ($Li_2S$) according to Preparation Example A2, shows a discharge capacity close to 1200 mAh/g at the first cycle of 0.1 C, and a discharge capacity of 900 mAh/g or more up to 50 cycles of 0.5 C.

However, a lithium-sulfur battery according to Comparative Example B2 equipped with a positive electrode active material layer formed by applying the slurry containing graphene and lithium sulfide ($Li_2S$) onto a current collector according to Comparative Example A2, shows a discharge capacity of 400 mAh/g or less.

As described above, it can be seen that the positive electrode active material layer formed by mechanically mixing graphene and lithium sulfide ($Li_2S$) is significantly improved compared to the positive electrode active material layer formed by casting a slurry containing graphene and lithium sulfide ($Li_2S$).

Figure 13:
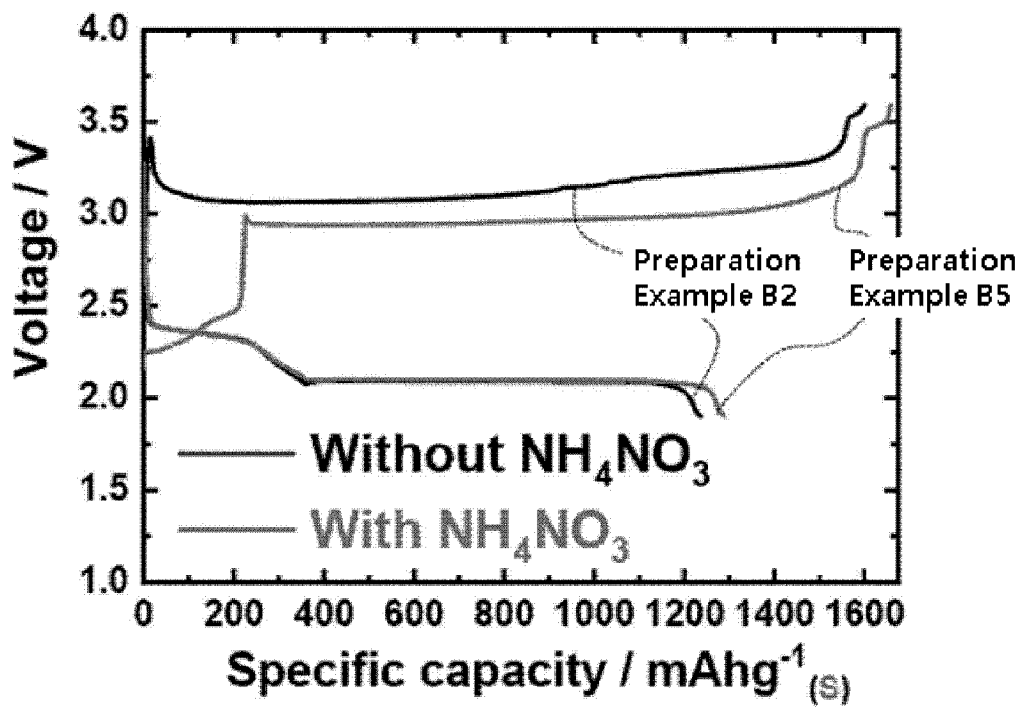
FIG. 13 is a graph showing charge and discharge characteristics of a lithium-sulfur batteries according to Preparation Example B2 and Preparation Example B5 at room temperature of about 30° C.
Figure 14:
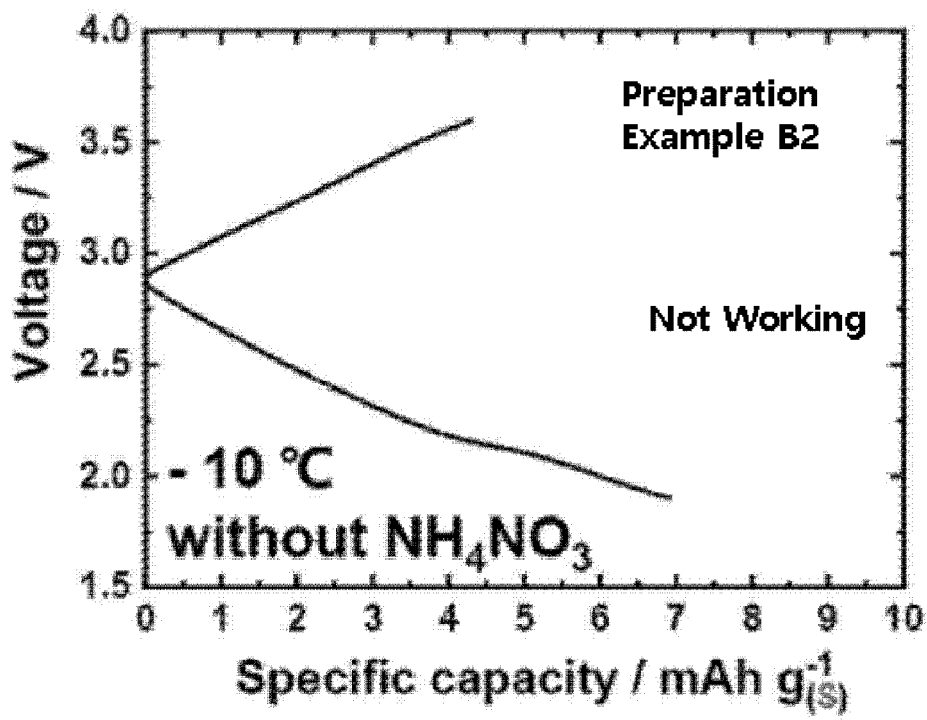
FIGS. 14 and 15 are graphs showing charge and discharge characteristics of lithium-sulfur batteries according to Preparation Example B2 and Preparation Example B5 at low temperature of about −10° C., respectively.
Figure 15:
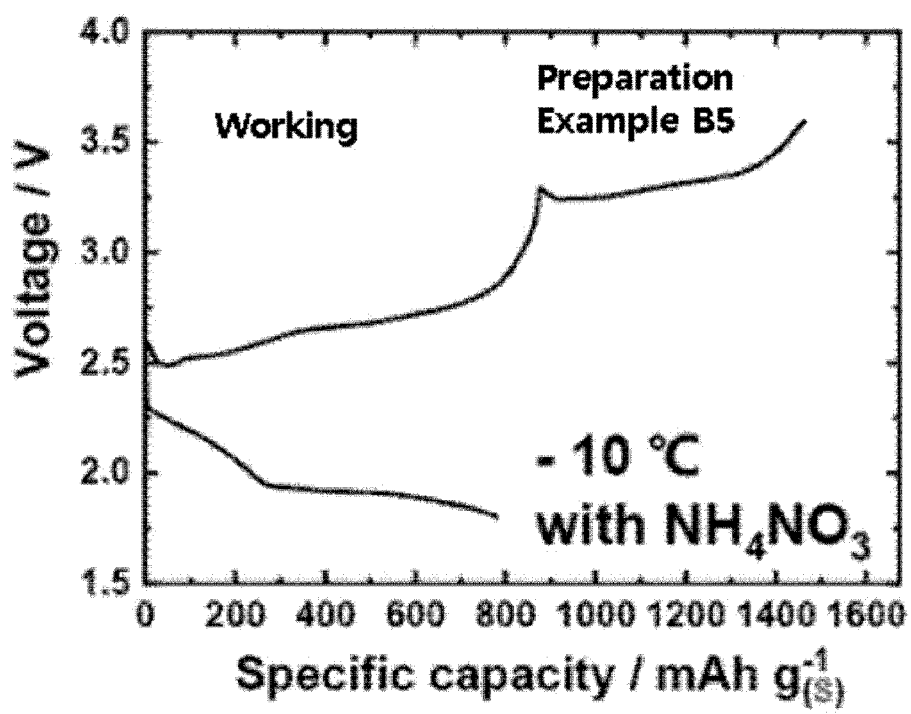

FIG. 13 is a graph showing charge and discharge characteristics of a lithium-sulfur batteries according to Preparation Example B2 and Preparation Example B5 at room temperature of about 30° C. FIGS. 14 and 15 are graphs showing charge and discharge characteristics of lithium-sulfur batteries according to Preparation Example B2 and Preparation Example B5 at low temperature of about −10° C., respectively. Here, the charging was performed by constant current charging at 0.1 c-rate up to 3.6 V, and the discharge was performed by 1.9 V at the same rate as the charging rate. In addition, the specific capacity shown on the X-axis of FIGS. 13 to 15 is the capacity with respect to the weight of the sulfur contained in the positive electrode active material.

Referring to FIGS. 13, 14, and 15, lithium-sulfur batteries using the positive electrode active material layer formed by mechanically mixing graphene and lithium sulfide can work at room temperature about 30° C. regardless of the presence of ammonium salt additives in the electrolyte. However, at low temperatures of about −10° C., the battery without the ammonium salt additive according to Preparation Example B2 hardly works (FIG. 14), while the battery containing ammonium salt additive according to Preparation Example B5 can work as showing charge capacity similar to the case when room temperature (FIG. 15). It is estimated that the ammonium ion of the ammonium salt additive lowers the activation energy for forming lithium polysulfide from lithium sulfide, so that charging can proceed smoothly even at low temperatures.

Figure 16:
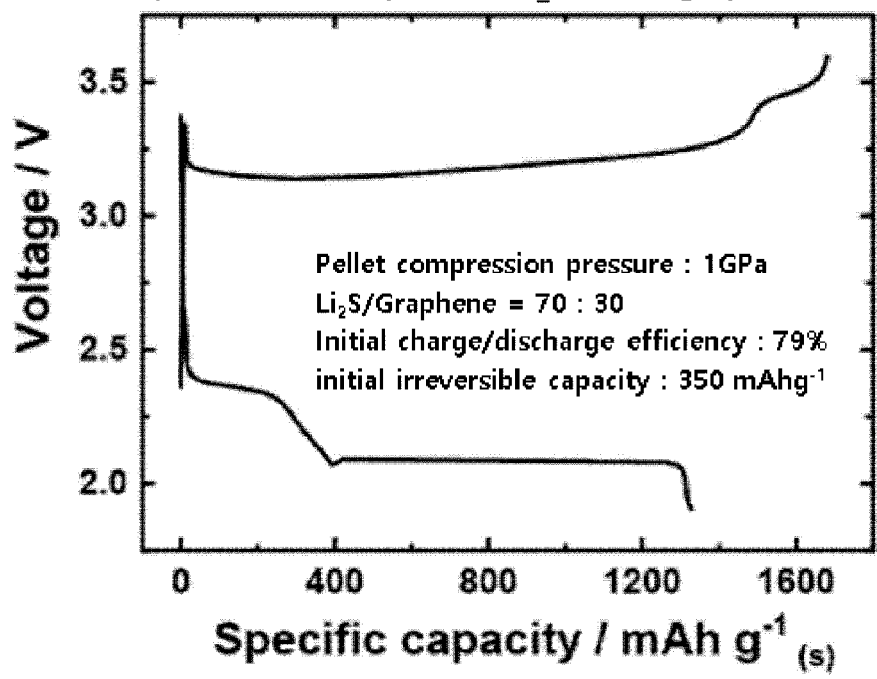
FIGS. 16 and 17 are graphs showing charge and discharge characteristics of lithium-sulfur batteries according to Preparation Example B2 and Preparation Example B3, respectively.
Figure 17:
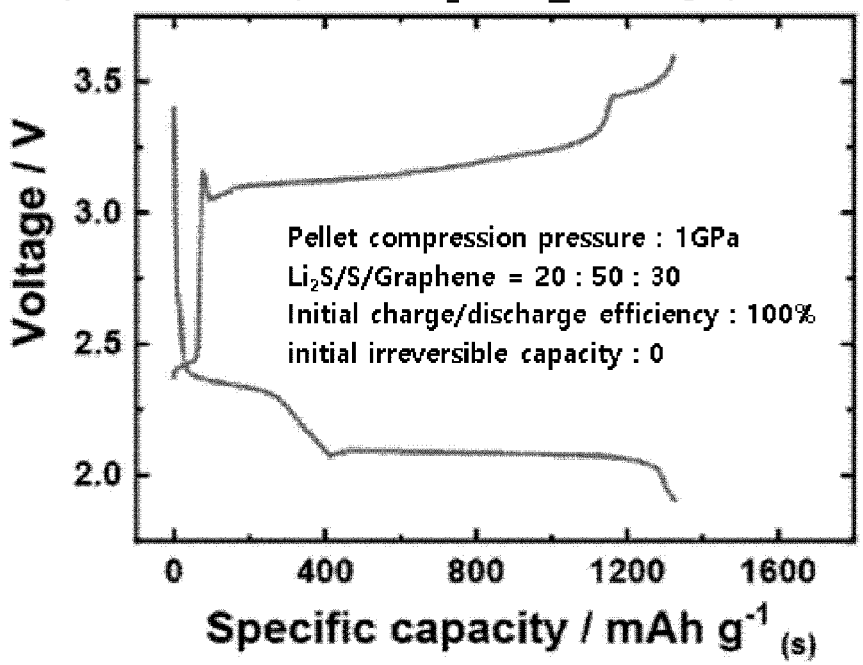

FIGS. 16 and 17 are graphs showing charge and discharge characteristics of lithium-sulfur batteries according to Preparation Example B2 and Preparation Example B3, respectively. Here, charging was performed by constant current charging at 0.1 c-rate up to 3.6 V, and discharge was performed by 1.9 V at the same rate as the charging rate. In addition, specific capacities shown on the X-axis of FIGS. 16 and 17 are capacity with respect to the weight of sulfur contained in the positive electrode active material.

Referring to FIGS. 16 and 17, while the lithium-sulfur battery using the positive electrode active material layer formed by mechanically mixing graphene and lithium sulfide according to Preparation Example B2 has an initial charge/discharge efficiency of about 79% and an initial irreversible capacity of about 350 mAh/g, the lithium-sulfur battery using the positive electrode active material layer formed by mechanically mixing sulfur in addition to graphene and lithium sulfide according to Preparation Example B3 has an initial charge/discharge efficiency of about 100% and an irreversible capacity of almost zero. This shows that in the case of adding sulfur in addition to lithium sulfide in the positive electrode active material layer, the amount of sulfur which can participate in the reaction during discharging after charging is increased to improve the discharge efficiency and thus almost eliminate the initial irreversible capacity.

Figure 18:
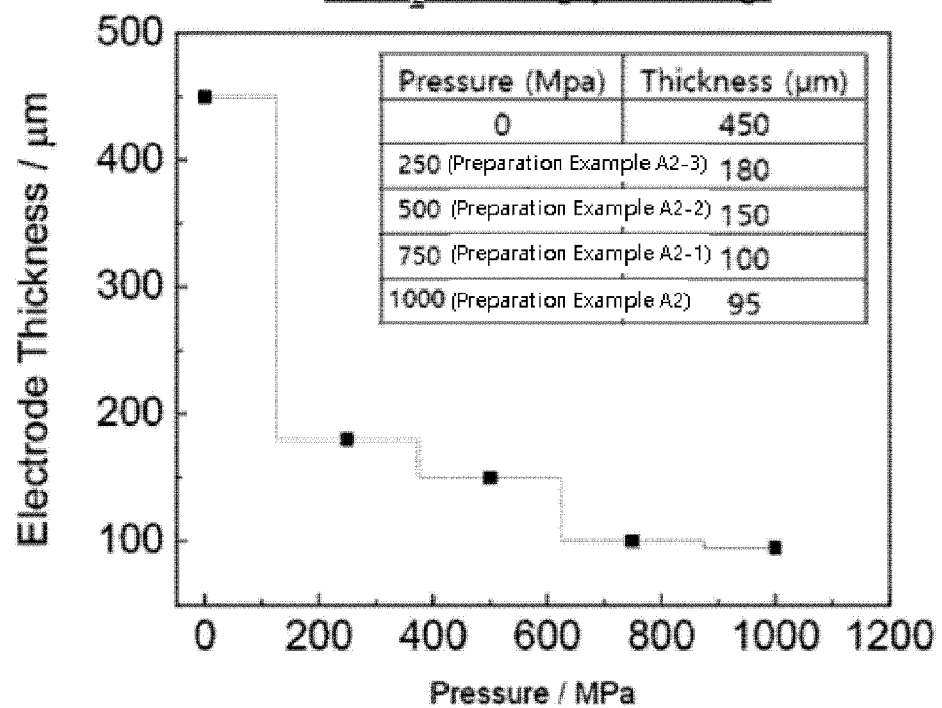
FIG. 18 is a graph showing the final thickness of the positive electrode active material layer according to Preparation Examples A2, A2-1, A2-2, and A2-3.

FIG. 18 is a graph showing the final thickness of the positive electrode active material layer according to Preparation Examples A2, A2-1, A2-2, and A2-3.

Referring to FIG. 18, the positive electrode active material layer before pressing showed a thickness of about 450 μm, but when pressed to about 1 GPa, the positive electrode active material layer was reduced to a thickness of about 95 μm. In the case of the positive electrode active material layer for a lithium-sulfur battery, it is necessary to contain a large amount of conductive carbon in order to secure the conductivity, which may increase the thickness of the positive electrode active material layer. However, in the case of forming the positive electrode active material layer by pressing as in the present embodiment, there is an advantage in that the thickness of the positive electrode active material layer can be significantly lowered while securing the conductivity.

Figure 19:
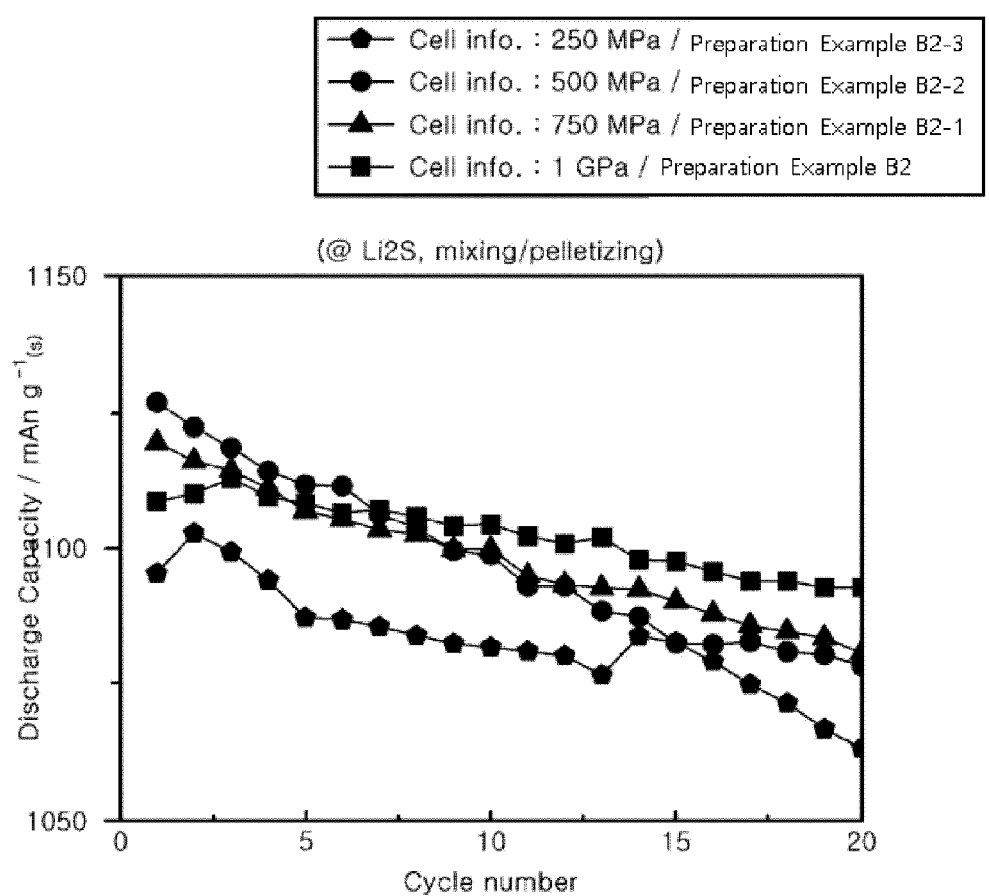
FIG. 19 is a graph showing cycle characteristics of a lithium-sulfur battery according to Preparation Examples B2, B2-1, B2-2, and B2-3.

FIG. 19 is a graph showing cycle characteristics of a lithium-sulfur battery according to Preparation Examples B2, B2-1, B2-2, and B2-3. Here, the charging was performed by constant current charging at 0.5 c-rate up to 2.8V, and the discharge was performed by 1.8 V at the same rate as the charging rate. In addition, the specific capacity shown on the Y-axis of FIG. 19 is a capacity with respect to the weight of sulfur contained in the positive electrode active material.

Referring to FIG. 19, it can be seen that a lithium-sulfur battery according to Preparation Example B2 having the positive electrode active material layer formed by pressurization at about 1 GPa exhibits the best discharge capacity retention rate.

Figure 20:
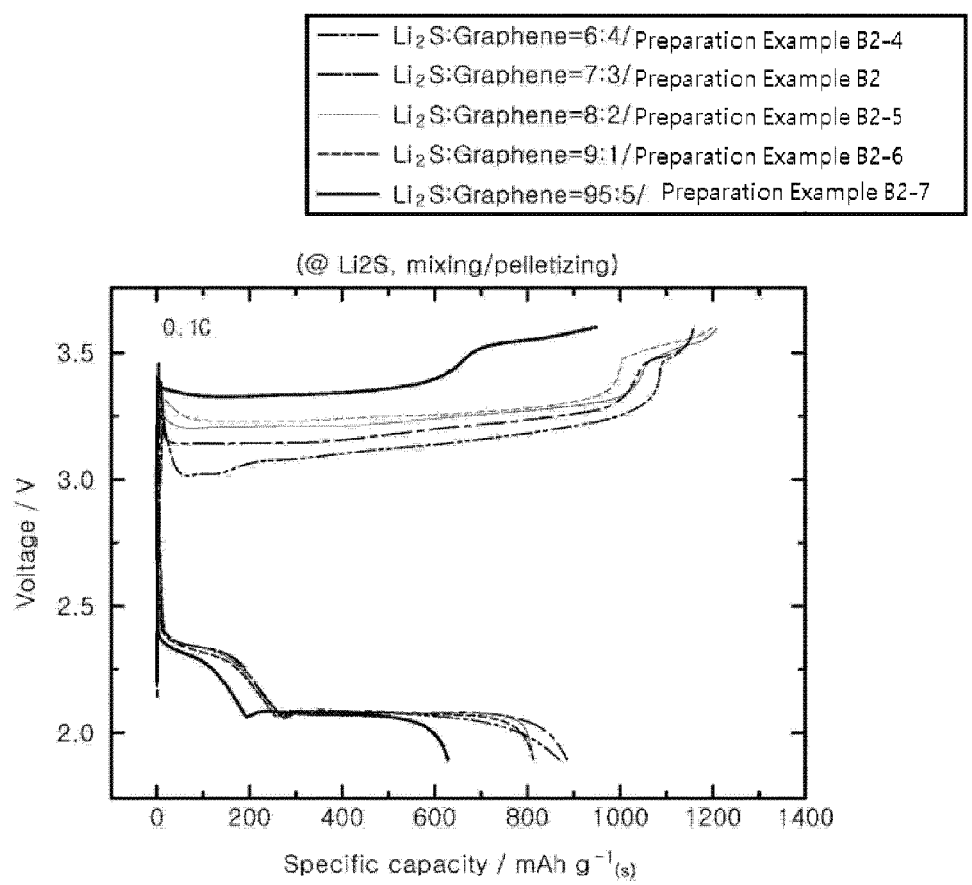
FIGS. 20 and 21 are graphs showing charge and discharge characteristics and cycle characteristics of lithium-sulfur batteries according to Preparation Examples B2, B2-4, B2-5, B2-6, and B2-7, respectively.
Figure 21:
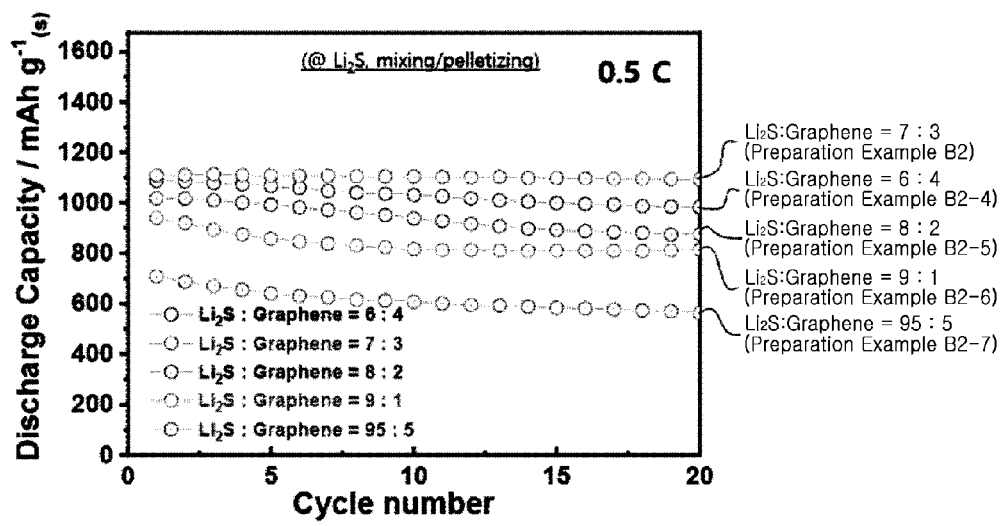

FIGS. 20 and 21 are graphs showing charge and discharge characteristics and cycle characteristics of lithium-sulfur batteries according to Preparation Examples B2, B2-4, B2-5, B2-6, and B2-7, respectively. The charge and discharge characteristics shown in FIG. 20 are obtained when constant current charge and discharge are performed at 3.6-1.9 V at a rate of 0.1 C, and the cycle characteristics shown in FIG. 21 are obtained when constant current charge and discharge are performed at 2.8-1.8 V at a rate of 0.5 C over 20 cycles. In addition, the specific capacity shown on the X-axis of FIG. 20 and Y-axis of FIG. 21 is a capacity with respect to the weight of sulfur contained in the positive electrode active material.

Referring to 20 and 21, in case of the batteries having the positive electrode active material layers comprising 60 to 90 wt % of lithium sulfide and remaining wt % of graphene compared to the battery where the weight ratio of lithium sulfide and graphene is 95:5, the discharge capacity was relatively excellent. Furthermore, when the lithium sulfide in the positive electrode active material layer is 60 to 80 wt %, and further, 60 to 70 wt %, specifically 70 wt %, it can be seen that the discharge capacity is further improved.

Figure 22:
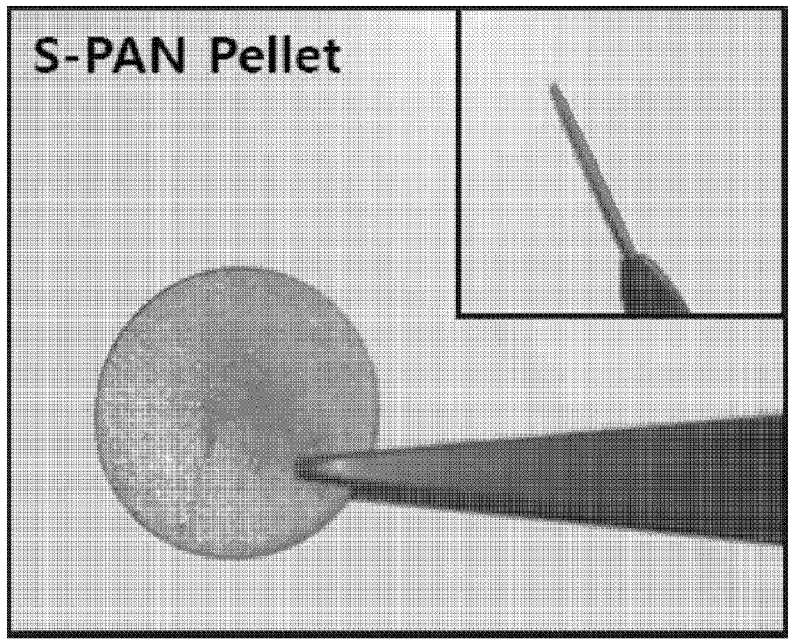
FIG. 22 is an optical image of the positive electrode active material layer according to Preparation Example A4.
Figure 23:
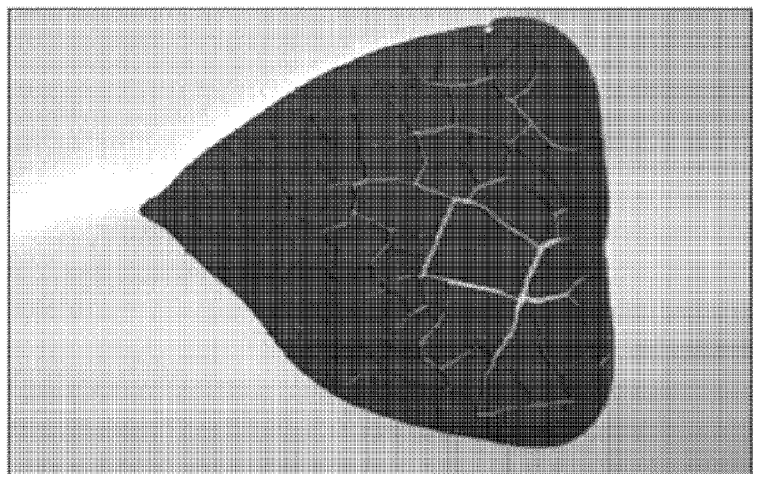
FIG. 23 is an optical image of the positive electrode active material layer according to Comparative Example A3.

FIG. 22 is an optical image of the positive electrode active material layer according to Preparation Example A4, and FIG. 23 is an optical image of the positive electrode active material layer according to Comparative Example A3.

Referring to FIGS. 22 and 23, a positive electrode active material layer formed by casting a slurry containing graphene and sulfur-polyacrylonitrile (S-PAN) according to Comparative Example A3 exhibited surface cracking due to aggregation of constituent materials and thus cannot be commercialized. However, it can be seen that the positive electrode active material layer formed by pressurizing the mixture of graphene and S-PAN according to Preparation example A4 shows good morphology without any cracking.

Figure 24:
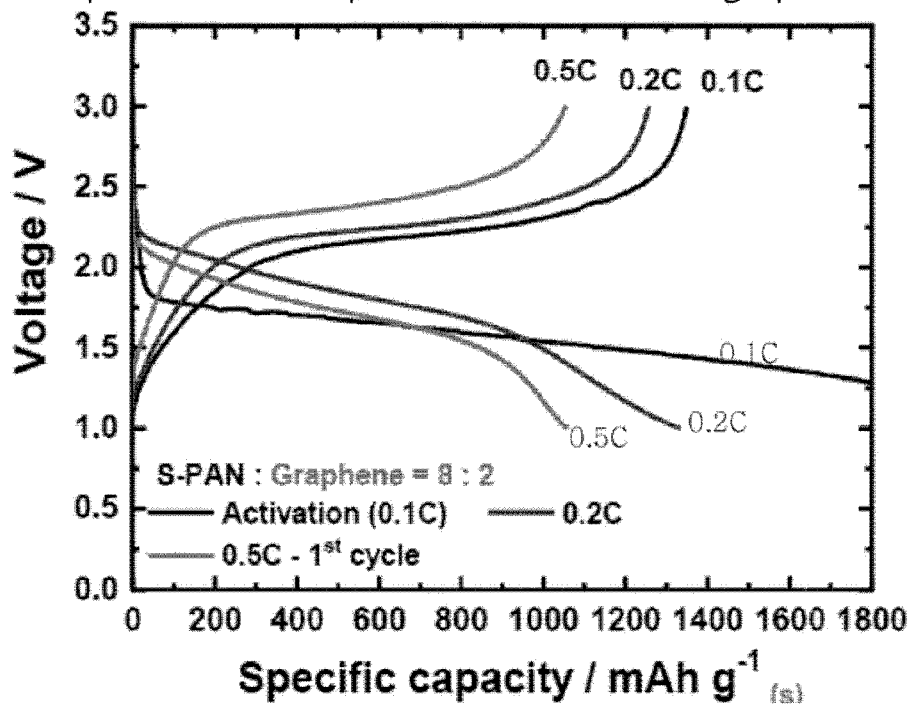
FIG. 24 is a graph showing the charge and discharge characteristics of the lithium-sulfur battery according to Preparation Example B4 with different rates.

FIG. 24 is a graph showing the charge and discharge characteristics of the lithium-sulfur battery according to Preparation Example B4 with different rates. Here, the charge was performed at constant current charge at 0.1, 0.2, and 0.5 c-rate up to 3.0V, and the discharge was performed to 1.0 V at the same rate as the charge rate. In addition, the specific capacity shown on the X-axis of FIG. 24 is represented by the capacity with respect to the weight of the sulfur contained in the positive electrode active material.

Referring to FIG. 24, it can be seen that the lithium-sulfur battery according to Preparation Example B4 exhibits excellent discharge capacity of 1000 mAh/g or more at a rate of 0.5 C after activation at a rate of 0.1 C.

Figure 25:
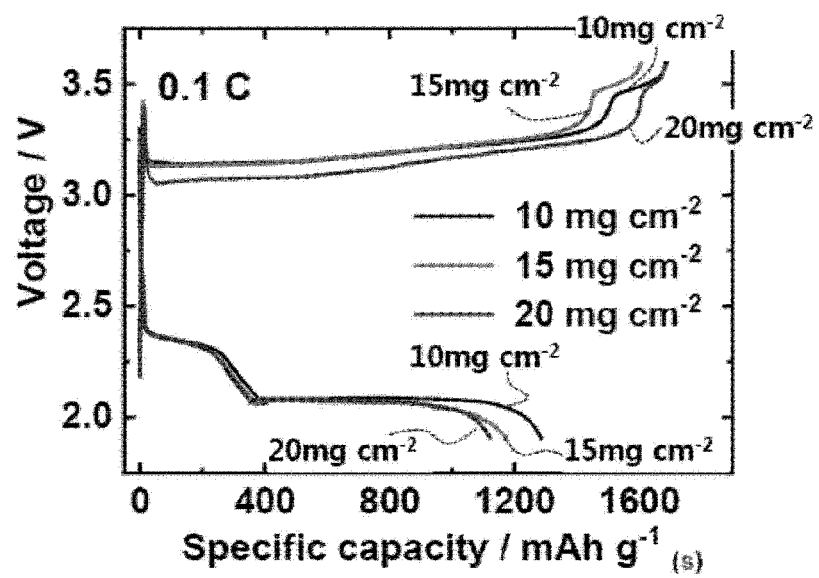
FIG. 25 is a graph showing charge and discharge characteristics of lithium-sulfur batteries according to Preparation Example B2 and its modifications, in which the loading of Sulfur was 15 mg/cm and 20 mg/cm instead of 10 mg/cm, which is the loading of Sulfur in Preparation Example B2.

FIG. 25 is a graph showing charge and discharge characteristics of lithium-sulfur batteries according to Preparation Example B2 and its modifications, in which the loading of Sulfur was 15 mg/cm and 20 mg/cm instead of 10 mg/cm, which is the loading of Sulfur in Preparation Example B2. In addition, the specific capacity shown on the X-axis of FIG. 25 is represented by the capacity with respect to the weight of the sulfur contained in the positive electrode active material.

Referring to FIG. 25, even if the loading amount of sulfur to 20 mg/cm, it can be seen that the charge and discharge characteristics are good. This is a characteristic difficult to obtain when the slurry casting method is used.

Figure 26:
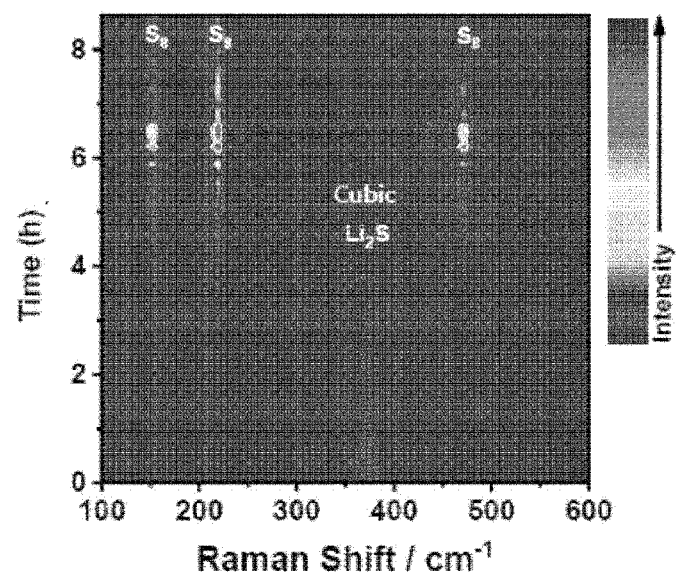
FIG. 26 shows an in-situ Raman graph for the positive electrode active material layer when the lithium-sulfur battery according to Preparation Example B2 is initially charged.

FIG. 26 shows an in-situ Raman graph for the positive electrode active material layer when the lithium-sulfur battery according to Preparation Example B2 is initially charged.

Referring to FIG. 26, $Li_2S$ of the cubic phase contained in the positive electrode active material layer during preparation may be confirmed to be decomposed and disappeared within 4 hours, and $S_8$ is generated as the charging proceeds. $Li_2S$ of the cubic phase may change into orthorhombic phase as disclosed in the above. However, the formation of lithium polysulfide in the charging process is not confirmed. Lithium polysulfide is known to limit the initial charging and discharging efficiency of the lithium-sulfur battery to about 60% because it is easy to dissolve in the electrolyte and thus cannot be utilized during discharging process after initial charging. However, Referring to FIG. 26, it was confirmed that lithium polysulfide was not produced during the initial charging process, and thus, the initial charging and discharging efficiency was estimated to improve to about 79% (see FIG. 16) since the loss of the lithium polysulfide in the electrolyte may not occur during the initial charging process.

On the other hand, the embodiments of the present invention disclosed in the specification and drawings are merely presented specific examples to aid understanding, and are not intended to limit the scope of the present invention. It is apparent to those skilled in the art that other modifications based on the technical spirit of the present invention can be carried out in addition to the embodiments disclosed herein.

The invention claimed is:

1. A positive electrode for a lithium-sulfur battery comprising:
a positive electrode active material layer including conductive carbon material and sulfur-containing material, wherein a region in which the sulfur-containing material is densified and a region in which the conductive carbon material is densified are arranged separately in the positive electrode active material layer, wherein the conductive carbon material is not impregnated with the sulfur-containing material, and wherein the positive electrode active material layer consists of the region in which the sulfur-containing material is densified and the region in which the conductive carbon material is densified.

2. The positive electrode of claim 1, wherein the sulfur-containing material is $S_8$, $Li_2S$, sulfurized polymer, or a mixture of two or more thereof.

3. The positive electrode of claim 2, wherein the sulfur-containing material is a mixture of $S_8$ and $Li_2S$.

4. The positive electrode of claim 3, wherein the weight of $S_8$ is higher than that of $Li_2S$ in the positive electrode active material layer.

5. The positive electrode of claim 1, wherein the conductive carbon material is graphene.

6. The positive electrode of claim 1, wherein the weight of the sulfur-containing material is higher than that of the conductive carbon material in the positive electrode active material layer.

7. The positive electrode of claim 1, wherein the positive electrode active material layer includes 60 to 90 wt % of the conductive sulfur-containing material and the remaining wt % of the carbon material.

8. The positive electrode of claim 1, wherein, in the region where the sulfur-containing material is densified, nano-sized sulfur-containing material particles are aggregated and surrounded by the conductive carbon material.

9. The positive electrode of claim 8, wherein the sulfur-containing material comprises lithium sulfide nanoparticles, and some of the lithium sulfide nanoparticles are rod-shaped nanoparticles.

10. The positive electrode of claim 1, wherein the sulfur-containing material comprises lithium sulfide, and the lithium sulfide has an orthorhombic crystal phase.

11. Method for producing a positive electrode for a metal-sulfur battery of claim 1, comprising:
preparing a mixture in which conductive carbon material and sulfur-containing material particles are mixed; and
putting the mixture into a mold to pressurize to form a positive electrode active material layer which is a freestanding film.

12. The method of claim 11, wherein the sulfur-containing material is $S_8$, $Li_2S$, sulfurized polymer, or a mixture of two or more thereof.

13. The method of claim 12, wherein the sulfur-containing material is a mixture of $S_8$ and $Li_2S$.

14. The method of claim 13, wherein the weight of $S_8$ is higher than that of $Li_2S$ in the positive electrode active material layer.

15. The method of claim 11, wherein the weight of the sulfur-containing material is higher than that of the conductive carbon material in the mixture.

16. The method of claim 11, wherein the pressurization is performed at 750 to 1100 MPa.

17. The method of claim 11, wherein the sulfur-containing material contains $Li_2S$, and the $Li_2S$ has a cubic phase in the mixture, and after being pressed, is changed into an orthorhombic phase in the positive electrode active material layer.

18. A metal-sulfur battery comprising:
the positive electrode of claim 1;
a negative electrode positioned to face the positive electrode; and
an electrolyte located between the positive electrode and the negative electrode.

19. The metal-sulfur battery of claim 18, wherein the electrolyte is a non-aqueous liquid electrolyte.

20. The metal-sulfur battery of claim 19, wherein the electrolyte further includes an ammonium salt.

* * * * *